July 9, 1957  N. W. BELL  2,799,015
VIBRATION INDICATOR
Filed Dec. 27, 1954

INVENTOR.
NORTON W. BELL
BY
Christie, Parker & Hale
ATTORNEYS

2,799,015

VIBRATION INDICATOR

Norton W. Bell, Monrovia, Calif., assignor, by mesne assignments, to Consolidated Electrodynamics Corporation, Pasadena, Calif., a corporation of California Application December 27, 1954, Serial No. 477,911

2 Claims. (Cl. 340—261)

This invention relates to apparatus for providing an indication of the amplitude of vibrations, and it has particular reference to vibration-indicating apparatus which is of simplified construction and which requires only a small amount of power.

In many instances it is desirable to provide an indication of the amplitude of vibration of a member and set off an alarm in case the amplitude of vibrations exceeds a predetermined amount. By way of example, such an arrangement is desirable as a protective device for use with machines such as turbines and engines so that defective operation of the machine may be detected soon after it starts, thereby warning an operator to stop the operation of the machine before greater damage results. This is particularly true with respect to engines for aircraft because defective operation of such an engine may cause substantial damage to the aircraft if the engine is permitted to vibrate for a substantial period of time.

In a vibration indicator for use on aircraft, it is desirable that the apparatus be of light weight and that it use only a small amount of power. This is achieved in the present invention by employing a self-generating pickup such as an electromagnetic velocity type for providing a signal representative of the amplitude and frequency of the vibrations, and by providing a passive network coupled between the pickup and an alarm indicator for actuating the alarm indicator in accordance with the signals provided by the pickup. Usually it is desirable that the vibration-indicating apparatus respond to vibrations having a predetermined frequency range. The frequency response of the apparatus of the present invention may be controlled by the use of a simple filter network in the passive network which intercouples the pickup and the alarm indicator.

The invention is explained in more detail with reference to the drawings, in which.

Figure 1:
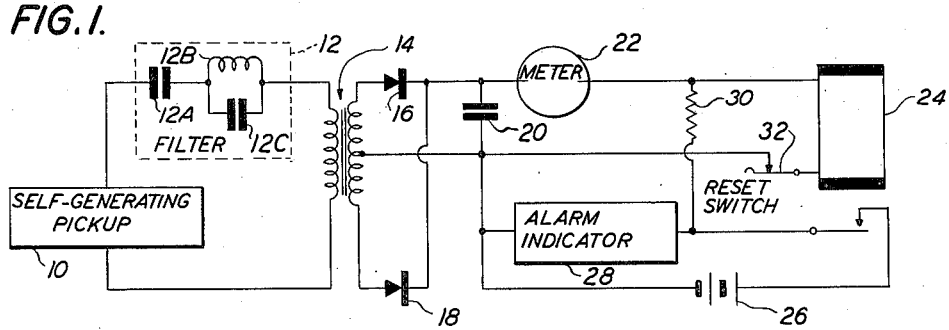
Fig. 1 illustrates one embodiment of the invention.

With reference to Fig. 1, a self-generating pickup 10 serves to provide a signal having an amplitude which varies with the amplitude of vibration of the pickup and having a frequency representative of the frequency of vibration of the pickup. Various types of self-generating pickups may be employed. Electromagnetic velocity pickups of the type used for vibration analysis which provide an output signal which is proportional to the velocity of movement of the pickup are particularly suitable.

A filter 12 is connected to the output of the self-generating pickup for altering the frequency response in accordance with the particular response desired.

The signal which is conveyed through the filter is applied to the primary winding of a transformer 14, and a pair of diodes 16 and 18 are connected to the secondary winding of the transformer for converting the signal to a direct current signal. A condenser 20 is connected across the output of the rectifying circuit for providing some filtering action so that the indicator will not respond to instantaneous signals.

The direct current signal which is developed across the condenser 20 is applied through a meter 22 to the winding of a relay 24. When the direct current signal which is applied to the winding of the relay exceeds a predetermined magnitude, then it actuates the armature of the relay, thereby completing the circuit between a source of potential 26 and an alarm indicator 28. The alarm indicator may be a lamp, or it may be a combination of a flasher switch and a lamp.

A resistor 30 is connected between the armature of the relay and relay winding for holding the relay in its actuated condition until a reset switch 32 is operated so as to open the circuit to the relay winding.

Thus, the meter 22 provides an indication of the amplitude of vibration of the self-generating pickup, and when the amplitude of vibration exceeds a predetermined amount, the relay is actuated so as to provide an alarm indication which continues until the apparatus is reset. A passive network is coupled between the self-generating pickup and the alarm indicator for actuating the alarm indicator in accordance with the signal provided by the pickup. The only power required is that which is employed to energize the alarm indicator.

Figure 2:
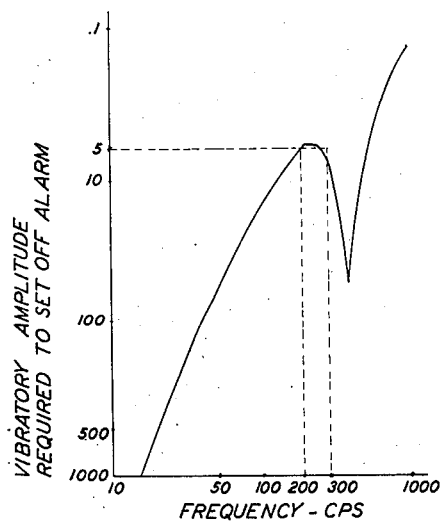
Fig. 2 is a curve illustrating the operation of the apparatus of Fig. 1.

An embodiment of the apparatus of Fig. 1 was arranged to provide an alarm indication whenever the vibratory amplitude of the self-generating pickup exceeded a selected level within the frequency range between 200 and 300 cycles per second. Fig. 2 shows the response of this embodiment of the invention with reference to the amplitude and the frequency of the vibrations. The frequency response of the apparatus was altered by the use of a simple filter for leveling off the vibratory amplitude required to set off the alarm over the desired frequency range between 200 and 300 cycles per second.

The circuit components employed in the embodiment of the invention of Fig. 1 to provide the response illustrated in Fig. 2 are as follows:

| | |
|---|---|
| Condenser 12A | 1.5 mf. |
| Condenser 12C | 0.33 mf. |
| Condenser 20 | 1.0 mf. |
| Inductance 12B | 0.5 H. |
| Transformer 14 | 750 ohms to 11,000 ohms. |
| Diodes 16 and 18 | 1N96. |
| Resistor 30 | 100,000 ohms. |
| Battery 26 | 28 volts. |

Figure 3:
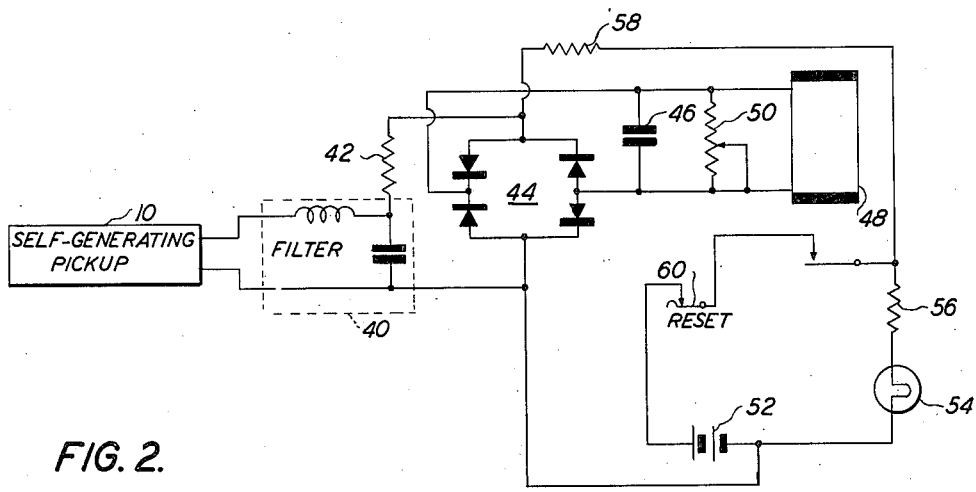
Fig. 3 shows an alternative embodiment of the invention.

Fig. 3 shows an alternative embodiment of the invention which was employed to provide an alarm indication in response to engine vibration in excess of ½" double amplitude at a frequency of 13.3 cycles per second.

As before, a self-generating pickup 10 is employed to provide an output signal having an amplitude representative of the amplitude of vibration of the pickup and having a frequency which represents the frequency of vibration of the pickup.

The output of the pickup 10 is applied through a low-pass filter 40 arranged to cut off at 25 cycles per second. The output of the filter is applied through a resistor 42 to a bridge rectifier 44. The output of the bridge rectifier 44 is applied across a filter condenser 46, and the signal developed across this condenser is applied to the winding of a relay 48. The armature of the relay is actuated when the signal applied to the relay winding exceeds a predetermined magnitude. An adjustable resistor 50 is connected in shunt with the relay winding for adjusting the level at which the relay operates.

When the armature of the relay is actuated, it closes a circuit between a source of potential 52 and an indicator lamp 54. A resistor 56 may be provided for limiting the current through the lamp.

A resistor 58 is provided for applying current from the actuated armature of the relay to the relay winding so as to hold the relay in its actuated condition until the reset switch 60 is operated to open the circuit.

The apparatus of Fig. 3 differs from that of Fig. 1 primarily in that it is arranged to function at a lower frequency and in that a resistor and a bridge rectifier have been substituted for the transformer and pair of diodes shown in Fig. 1.

I claim:

1. A vibration indicating system for indicating when the amplitude of a mechanical vibration exceeds a selected limit within a selected frequency range comprising a self-generating pickup for providing an output signal having an amplitude representative of the amplitude of vibration of the pickup and having a frequency representative of the frequency of vibration of the pickup, an alarm indicator, and a passive circuit responsive to the signal from the pickup for actuating the alarm indicator, said passive circuit comprising a passive filter circuit coupled to the output of the pickup for selectively passing signal components in the frequency range of interest, a passive rectifier circuit coupled to the filter circuit for converting the alternating signal passed by the filter to a direct current signal of proportional amplitude, a direct current relay coupled to the rectifier circuit and responsive to the direct current exceeding a selected value for actuating the alarm indicator, and passive means for adjusting the current value at which the relay operates.

2. A vibration indicating system for indicating when the amplitude of a mechanical vibration exceeds a selected limit within a selected frequency range comprising a self-generating pickup for providing an output signal having an amplitude representative of the amplitude of vibration of the pickup and having a frequency representative of the frequency of vibration of the pickup, an alarm indicator, and a passive circuit responsive to the signal from the pickup for actuating the alarm indicator, said passive circuit comprising a passive filter circuit coupled to the output of the pickup for selectively passing signal components in the frequency range of interest, a passive rectifier circuit coupled to the filter circuit for converting the alternating signal passed by the filter to a direct current signal of proportional amplitude, a direct current relay coupled to the rectifier circuit and responsive to the direct current exceeding a selected value for actuating the alarm indicator, and passive means coupled between the passive rectifier circuit and the winding of the direct current relay for smoothing out changes in the direct current signal in response to changes in the amplitude of the alternating current signal from the filter circuit so that a mere instantaneous exceeding of the vibration amplitude limit does not cause the alarm indicator to be actuated.

References Cited in the file of this patent

UNITED STATES PATENTS

| | | |
|---|---|---|
| 2,278,939 | Muehter | Apr. 7, 1942 |
| 2,308,390 | Ritzmann | Jan. 12, 1943 |
| 2,363,373 | Werner | Nov. 21, 1944 |
| 2,524,579 | Taylor | Oct. 3, 1950 |